Patented Mar. 11, 1952

2,588,428

UNITED STATES PATENT OFFICE 2,588,428

COMPLEX AMINE PRODUCTS WITH DIALKYL ZINC DITHIOCARBAMATES AS PESTICIDES

William D. Stewart and John H. Standen, Yonkers, N. Y., assignors to The B. F. Goodrich Company, New York, N. Y., a corporation of New York No Drawing. Application April 2, 1945,
Serial No. 586,281

14 Claims. (Cl. 167—22)

This invention relates to pest control compositions and more particularly to compositions which are useful as bactericides, fungicides and insecticides.

This invention has for its general object the provision of new and useful compositions having the power of killing or repelling economically or physiologically harmful pests, such as bacteria, fungi, insects and the like which prey on plant and animal matter either in its animate or inanimate, or fabricated state. The terms "pesticide" and "pesticidal" as used in this specification and in the claims are intended to designate compositions which either kill or repel such pests. Other objects will appear hereinafter.

These objects are accomplished by the following invention of pesticidal compositions comprising as an essential active ingredient a reaction product of a zinc dithiocarbamate, and an amine having at least one active hydrogen in the amino group and especially amines of an aliphatic nature.

The zinc dithiocarbamates with which amines may be reacted to give the compounds which are useful according to this invention are those in which the dithiocarbamate radical contains a secondary or tertiary nitrogen group, the same resulting from the interaction of a primary or secondary amine and carbon bisulfide, in accordance with the equation:

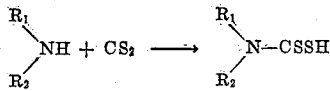

a metallic radical or the equivalent being present during the reaction to yield the acid in the form of its salt. $R_1$ and $R_2$ may represent one organic group and hydrogen or two individual organic groups, such as two methyl groups, or together they may represent one bivalent group such as a pentamethylene group present in piperidene or an oxy diethylene group present in morpholine. Preferably, $R_1$ and $R_2$ will be aliphatic in nature including such representative groups as alkyl, alicyclic, aralkyl and the like.

The amine which is added to or combined with a zinc dithiocarbamate may be any of the organic amines available having at least one hydrogen atom in the amino group, but amines of aliphatic nature are preferred, particularly the alkyl amines and diamines, such as butyl amine, hexadecyl amine, dimethyl amine, diamyl amine, ethylene diamine, hexadecyl propylene diamine, dibutyl ethylene diamine, cyclohexylamine, piperidene, symmetrical dimethyl ethylene diamine, symmetrical diethyl triethylene diamine, and especially those having a cyclohexyl group and an alkyl group of no more than eight carbon atoms such as N-butyl cyclohexylamine, N-ethyl cyclohexylamine, N-methyl cyclohexylamine, and the like. The term "amine" as employed in the specification and claims is intended to include all the amines of the type indicated of which the preceding are merely examples.

The addition products which are preferred as pesticides are those products formed by the reaction of equimolecular portions of a zinc dithiocarbamate and an amine. Said addition products are prepared by bringing together the zinc dithiocarbamate and the amine, preferably in the presence of a reaction diluent such as water, alcohol, gasoline, and the like. To speed up the reaction, the mixture may be heated, the boiling point of the common volatile solvents being a convenient temperature. The procedure for these reactions is more fully described in the patents and in the literature which are concerned with the methods of preparing these addition products. One of the physical properties of these products which aids in their application as pesticides is their solubility in solvents or mixtures of solvents.

We have discovered that these addition products are highly efficient fungicides and insecticides, being effective in aqueous dispersion as dilute as 0.1 to 10 p. p. m. against *Culex quinquefasciatus* (mosquito) larvae, against spores of *Alternaria solani*, and killing Japanese beetles and Mexican bean beetles by employing dispersions of only 0.5% by weight of these addition products.

The addition products with which this invention is concerned were tested to determine their fungicidal, insecticidal and bactericidal activity according to methods understood by those familiar with the art of testing insecticides, fungicides and bactericides.

The more detailed practice of the invention is illustrated by the following examples and descriptions. They illustrate the application of specific zinc dithiocarbamate and amine addition products to bactericidal, fungicidal and insecticidal uses. These examples are intended to be illustrative and not limiting. In each test various amounts of the specific addition product were employed, but only those tests which illustrate the remarkable effectiveness of the materials or the results which can be used for comparison with other pesticides are given in detail.

Example I

Bean foliage is dipped in an 0.5% aqueous dispersion of the 1:1 addition product of cyclohexylamine and zinc dimethyl dithiocarbamate and then placed in Petri dishes. Mexican bean beetles and Japanese beetles are then placed on the treated foliage while wet in the Petri dishes, and the dishes are covered. By this treatment all the beetles are dead within 24 hours with no damage to the foliage.

Example II

Ten *Culex quinquefasciatus* larvae five to six days old are placed in aqueous dispersions containing respectively 1 p. p. m. and 10 p. p. m. of the 1:1 addition product of cyclohexylamine and zinc dimethyl dithiocarbamate in duplicate sets which are then incubated for 16 hours at 29° C. The dispersion containing 1 p. p. m. of the addition product killed 80% of the larvae; the dispersion containing 10 p. p. m. of the addition product killed 100% of the larvae.

Example III

Bean foliage is dipped in a 0.5% aqueous dispersion of the 1:1 addition product of the ethylene diamine and zinc dimethyl dithiocarbamate and then placed in Petri dishes. A known number of Japanese beetles are placed on the wet treated bean foliage in the Petri dishes and the dishes are covered. By this treatment all of the beetles are dead within 24 hours with no damage to the foliage. When Japanese beetles were immersed in the above 0.5% aqueous dispersion and placed on bean foliage in Petri dishes, there was no feeding and all of the beetles were dead within 24 hours.

From these examples it is evident that these addition products can be successfully used as insecticides. They can also be used as a spray by dissolving them in a solvent which can be used as an insecticide carrier. Other insecticide materials such as rotenone may be incorporated to produce a spray of general utility. Where a dust-type insecticide is desired, these addition products can be milled with talc or bentonite in the proper proportions to produce a dust which will be effective. These materials can also be prepared as aerosols and be used with satisfactory results.

The reaction products of amines and zinc dithiocarbamates are not limited in use to insecticides but also are very effective as fungicides. The following examples illustrate their ability to prevent the growth of fungi and molds.

Example IV

In an agar plate test to determine fungicidal activity, the 1:1 addition product of cyclohexylamine and zinc dimethyl dithiocarbamate is incorporated into Difco malt extract agar, the treated agar is then poured into Petri dishes, and the agar nutrient is inoculated by spraying same with a spore suspension of *Alternaria solani* and others with a spore suspension of *Sclerotinia fructicola* by means of an atomizer. By this treatment it was found that when 1 part per million of the chemical was present none of the spores of either fungus germinated when incubated for 3 days at 21° C.

Example V

To determine the fungicidal activity of these addition products in a spore suspension test, the 1:1 addition product of cyclohexylamine and zinc dimethyl dithiocarbamate is added in the proportion of 1 p. p. m. to spore suspensions of *Alternaria solani* and *Sclerotinia fructicola* each in a 1% orange juice solution containing 50,000 spores/ml. Small droplets of these mixtures are placed on microscopic slides and incubated at 21° C. in a moist chamber for 18 to 24 hours. On examination it is found that none of the spores germinated in the spore suspensions thus treated.

These addition products are also effective as fungicides for the treatment of cotton fabrics to prevent destruction of the fabric by "mildew" which is the destruction of the cotton fibers by mold (fungi) and bacteria. The molds, microorganisms belonging to the family of plants known as thallophytic plants, are plants which derive their nourishment wholly, or almost wholly, from organic compounds. The molds responsible for rotting are capable of converting the carbon of the cotton cellulose into a readily assimilable food which can result in complete destruction of the cotton material. This destruction is exceedingly rapid under tropical conditions, for, if the fabric or cotton material is in contact with the ground, there is complete destruction of the material in 5 to 7 days. The following example demonstrates the ability of these addition compounds to prevent "mildew" destruction to cotton fabric.

Example VI

Test pieces of cotton fabrics are dipped in a 1% aqueous dispersion of the 1:1 addition product of cyclohexylamine and zinc dimethyl dithiocarbamate and then buried with untreated test pieces in soil heavily infested with cellulose-decomposing microorganisms. After 21 days there is very little change in appearance or strength of the treated fabric, while the untreated test piece is virtually destroyed by "mildew".

The 1:1 addition product of ethylene diamine and zinc dimethyl dithiocarbamate is equally effective against fungi. The following example illustrates its effectiveness in the spore suspension test.

Example VII

A concentration of 1 p. p. m. of the 1:1 addition product of ethylene diamine and zinc dimethyl dithiocarbamate is added to spore suspensions of *Alternaria solani* and *Sclerotinia fructicola* in orange juice solutions and tested as in Example V. After incubation in a moist chamber for 18 to 24 hours at 21° C., none of the spores had germinated.

These addition products are also effective bactericides. Their ability to kill bacteria is illustrated in the following example.

Example VIII

The 1:1 addition product of cyclohexylamine and zinc dimethyl dithiocarbamate was used as a bactericide over a wide range of concentrations to determine its killing power on *Staphylococcus aureus*, but only the lower portion of the killing concentrations are given. 10 to 100 p. p. m. of the 1:1 addition product of cyclohexylamine and zinc dimethyl dithiocarbamate are incorporated into 10 ml. portions of Difco nutrient broth and 10% beef serum containing *Staphylococcus aureus*. After incubation at 40° C. for 24 hours, it is found that 10 p. p. m. is sufficient to kill the bacteria in the broth, while 100 p. p. m. will kill the bacteria in the serum.

The addition products of amines with zinc dithiocarbamates are not only useful in killing Mexican bean beetles, Japanese beetles and mosquito larvae, but they also may be used to kill or repel other insect pests such as codling moths, carpet beetles, confused flour beetle adults and larvae, flies, moths, ticks, fleas, and the like.

These addition products may be used in combination with other active ingredients such as metallic arsenicals, fluosilicates, organic thiocyanates, phenothiazine, nicotine, pyrethrum, isobutylundecylenamide, and others. These mixtures may also be diluted with inert ingredients such as talc, calcium carbonate and tricalcium phosphate, or they may be dissolved or suspended in petroleum hydrocarbons, water, or alcohol. Dispersing, wetting and spreading agents such as lauryl alcohol, long-chain alcohol sulfates, sulfated and sulfonated alcohols, sodium salts of sulfated alcohols, sulfonated aliphatic derivatives, sulfonated aromatic and alkylaryl derivatives, hexahydric alcohol, esters of fatty acids, pine oils, and soybean lecithin may be used to aid in stabilizing the suspensions. Adhesives or sticking agents such as milk products, flour, gelatine and fish oils may be incorporated into the mixture to increase the retention or tenacity of spray deposits.

By employing these addition products in solutions, dispersions or dusts, they may be used as agents for protecting plant and animal products such as wool, fur, silk, wood and other cellulosic materials, regenerated cellulose, cotton, leather, glue, paper, and plant latices from harmful pests, especially molds (fungi), insects and bacteria while the material to be protected is a raw material or a finished product.

The solvents, dusts and aqueous suspensions generally used for convenience of application of pesticides, have the common property of permitting projection of the materials through suitable jets or nozzles onto the materials to be treated, and will be designated in the appended claims for convenience, as "fluent carriers."

Since these addition products are not appreciably soluble in water, leaching of the protective agent from fabrics that are treated with these addition products and subjected to all weather conditions is not a serious problem.

The above description and examples are intended to be illustrative only. Any modification of or variation therefrom which conforms to the spirit of the invention is intended to be included within the scope of the claims.

We claim:

1. A method of protecting materials which are capable of nourishing bacteria, fungi and insects from destruction by said pests which comprises bringing the material into contact with the addition product of an aliphatic substituted zinc dithoicarbamate and an amine having at least one hydrogen atom in the amino group.

2. A method of protecting materials which are capable of nourishing bacteria, fungi and insects from destruction by said pests which comprises bringing the material into contact with the addition product of an alkyl substituted zinc dithiocarbamate and an amine having at least one hydrogen atom in the amino group.

3. A method of protecting materials which are capable of nourishing bacteria, fungi and insects from destruction by said pests which comprises bringing the material into contact with the addition product of a dialkyl substituted zinc dithiocarbamate and an amine having at least one hydrogen atom in the amino group.

4. A method of protecting materials capable of nourishing bacteria, fungi and insects from destruction by said pests which comprises bringing the material into contact with the addition product of zinc dimethyl dithiocarbamate and an amine having at least one hydrogen atom in the amino group.

5. A method of protecting materials which are capable of nourishing bacteria, fungi and insects from destruction by said pests which comprises bringing the material into contact with a mixture of a fluent carrier and a small proportion of the addition product of zinc dimethyl dithiocarbamate and ethylene diamine.

6. A method of protecting materials which are capable of nourishing bacteria, fungi and insects from destruction by said pests which comprises bringing the material into contact with a mixture of a fluent carrier and a small proportion of the addition product of zinc dimethyl dithiocarbamate and cyclohexyl amine.

7. A pesticidal composition essentially containing particles of an active ingredient dispersed in a fluent carrier, the carrier being an aqueous solution of a wetting agent and the active ingredient being the product of the chemical addition of the zinc salt of an N-aliphatic substituted dithiocarbamic acid with an amine in which each amino group contains at least one hydrogen atom.

8. A pesticidal composition essentially containing particles of an active ingredient dispersed in a fluent carrier, the carrier being an aqueous solution of a wetting agent and the active ingredient being the product of the chemical addition of the zinc salt of an N-alkyl substituted dithiocarbamic acid with an amine in which each amino group contains at least one hydrogen atom.

9. A pesticidal composition essentially containing particles of an active ingredient dispersed in a fluent carrier, the carrier being an aqueous solution of a wetting agent and the active ingredient being the product of the chemical addition of the zinc salt of an N-dialkyl substituted dithiocarbamic acid with an amine in which each amino group contains at least one hydrogen atom.

10. A pesticidal composition essentially containing particles of an active ingredient dispersed in a fluent carrier, the carrier being an aqueous solution of a wetting agent and the active ingredient being the product of the chemical addition of zinc dimethyl dithiocarbamate with an amine in which each amino group contains at least one hydrogen atom.

11. A pesticidal composition essentially containing particles of an active ingredient dispersed in a fluent carrier, the carrier being an aqueous solution of a wettng agent and the active ingredient being the product of the chemical addition of zinc dimethyl dithiocarbamate with ethylene diamine.

12. A pesticidal composition essentially containing particles of an active ingredient dispersed in a fluent carrier, the carrier being an aqueous solution of a wetting agent and the active ingredient being the product of the chemical addition of zinc dimethyl dithiocarbamate with cyclohexylamine.

13. A pesticidal composition comprising an active ingredient and a finely-divided solid carrier, the active ingredient being the product of the chemical addition of a zinc salt of an N-aliphatic substituted dithiocarbamic acid with an amine having at least one hydrogen atom in the amino group.

14. A composition according to claim 13 wherein the active ingredient is the addition product of zinc dimethyl dithiocarbamate and cyclohexyl amine.

WILLIAM D. STEWART.
JOHN H. STANDEN.

REFERENCES CITED

The following references are of record in the file of this patent:

UNITED STATES PATENTS

| Number | Name | Date |
|---|---|---|
| 1,972,961 | Tisdale et al. | Sept. 11, 1934 |
| 2,243,544 | ter Horst | May 27, 1941 |
| 2,317,765 | Hester | Apr. 27, 1943 |
| 2,321,301 | Lichty | June 8, 1943 |

FOREIGN PATENTS

| Number | Country | Date |
|---|---|---|
| 8103/32 | Australia | Apr. 24, 1933 |

OTHER REFERENCES

Guy: Investigation of Organic Compounds as Insecticides, Bull. No. 206, Technical No. 19, February 1937, University of Delaware Agri. Exp. Station, pp. 54–55, 167–22.